(12) United States Patent
Cunha et al.

(10) Patent No.: US 10,174,949 B2
(45) Date of Patent: Jan. 8, 2019

(54) GAS TURBINE ENGINE COMBUSTOR LINER ASSEMBLY WITH CONVERGENT HYPERBOLIC PROFILE

(71) Applicant: United Technologies Corporation, Hartford, CT (US)

(72) Inventors: Frank J. Cunha, Avon, CT (US); Nurhak Erbas-Sen, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 536 days.

(21) Appl. No.: 14/765,227

(22) PCT Filed: Feb. 5, 2014

(86) PCT No.: PCT/US2014/014819
§ 371 (c)(1),
(2) Date: Jul. 31, 2015

(87) PCT Pub. No.: WO2014/189556
PCT Pub. Date: Nov. 27, 2014

(65) Prior Publication Data
US 2015/0369490 A1    Dec. 24, 2015

Related U.S. Application Data

(60) Provisional application No. 61/762,367, filed on Feb. 8, 2013.

(51) Int. Cl.
| F23R 3/50 | (2006.01) |
| F23R 3/00 | (2006.01) |
| F23R 3/60 | (2006.01) |

(52) U.S. Cl.
CPC ............. *F23R 3/50* (2013.01); *F23R 3/002* (2013.01); *F23R 3/60* (2013.01); *F23R 2900/03042* (2013.01); *Y02T 50/675* (2013.01); *Y10T 29/49828* (2015.01)

(58) Field of Classification Search
CPC .... F23R 3/50; F23R 3/002; F23R 3/60; F23R 3/00; F02C 7/20
See application file for complete search history.

(56) References Cited

U.S. PATENT DOCUMENTS

| 3,986,347 | A | 10/1976 | Schirmer |
| 4,012,902 | A | 3/1977 | Schirmer |
| 4,242,871 | A | 1/1981 | Breton |
| 4,380,905 | A | 4/1983 | Smart et al. |
| 4,655,044 | A | 4/1987 | Dierberger et al. |

(Continued)

FOREIGN PATENT DOCUMENTS

EP    2273196    1/2011

OTHER PUBLICATIONS

Yusop et al., "Effusion Film Cooling: Adiabatic Cooling Effectiveness of Two Multihole Patterns", University of Leeds, Leeds LS2 9JT, United Kingdom, 2007.

(Continued)

*Primary Examiner* — Craig Kim
(74) *Attorney, Agent, or Firm* — O'Shea Getz P.C.

(57) ABSTRACT

A heat shield for a combustor of a gas turbine engine includes a first edge with a first set of cantilevered members and a second edge with a second set of cantilevered members.

14 Claims, 12 Drawing Sheets

(56) References Cited

U.S. PATENT DOCUMENTS

| | | |
|---|---|---|
| 4,763,481 A | 8/1988 | Cannon |
| 4,843,825 A * | 7/1989 | Clark .................. F23R 3/002 60/39.37 |
| 5,079,915 A | 1/1992 | Veau |
| 5,169,287 A | 12/1992 | Proctor et al. |
| 5,181,379 A | 1/1993 | Wakeman et al. |
| 5,233,828 A | 8/1993 | Napoli |
| 5,261,223 A | 11/1993 | Foltz |
| 5,271,220 A | 12/1993 | Holmes et al. |
| 5,279,127 A | 1/1994 | Napoli |
| 5,323,604 A | 6/1994 | Ekstedt et al. |
| 5,619,855 A | 4/1997 | Burrus |
| 5,623,827 A | 4/1997 | Monty |
| 5,630,319 A | 5/1997 | Schilling et al. |
| 5,657,633 A | 8/1997 | Brueggert |
| 6,237,344 B1 | 5/2001 | Lee |
| 6,279,323 B1 | 8/2001 | Monty et al. |
| 6,286,298 B1 | 9/2001 | Barrus et al. |
| 6,314,717 B1 | 11/2001 | Teets et al. |
| 6,374,615 B1 | 4/2002 | Zupanc et al. |
| 6,540,162 B1 | 4/2003 | Johnson et al. |
| 6,655,147 B2 | 12/2003 | Farmer et al. |
| 6,736,338 B2 | 5/2004 | Johnson et al. |
| 7,093,439 B2 | 8/2006 | Pacheco-Tougas et al. |
| 7,093,441 B2 | 8/2006 | Burd et al. |
| 7,363,763 B2 | 4/2008 | Coughlan, III et al. |
| 7,681,398 B2 | 3/2010 | Patel et al. |
| 7,721,548 B2 | 5/2010 | Patel et al. |
| 7,748,221 B2 | 7/2010 | Patel et al. |
| 7,886,540 B2 | 2/2011 | Webb |
| 7,954,325 B2 | 6/2011 | Burd et al. |
| 8,015,829 B2 | 9/2011 | Coughlan, III et al. |
| 8,171,735 B2 | 5/2012 | Mancini et al. |
| 8,683,806 B2 * | 4/2014 | Commaret .............. F23R 3/002 60/752 |
| 2003/0213250 A1 | 11/2003 | Pacheco-Tougas et al. |
| 2005/0061004 A1 | 3/2005 | Colibaba-Evulet et al. |
| 2007/0059178 A1 | 3/2007 | Shapiro |
| 2007/0180828 A1 | 8/2007 | Webb |
| 2008/0115506 A1 * | 5/2008 | Patel ...................... F02C 3/145 60/804 |
| 2008/0256955 A1 | 10/2008 | Parkman et al. |
| 2010/0095678 A1 | 4/2010 | Hawie et al. |
| 2010/0223931 A1 | 9/2010 | Chila et al. |
| 2010/0240584 A1 | 9/2010 | Berdou et al. |
| 2010/0293957 A1 | 11/2010 | Chen et al. |
| 2011/0126543 A1 | 6/2011 | Kirsopp |
| 2013/0000309 A1 | 1/2013 | Dierberger |
| 2013/0019603 A1 | 1/2013 | Dierberger et al. |
| 2013/0055725 A1 * | 3/2013 | Rauch .................. F01D 25/30 60/796 |
| 2014/0053559 A1 * | 2/2014 | Maurer .................. F23R 3/002 60/725 |
| 2015/0176843 A1 * | 6/2015 | Garry .................... F23M 5/04 60/753 |
| 2015/0362192 A1 | 12/2015 | Cunha et al. |

OTHER PUBLICATIONS

Extended EP Search Report dated Jun. 3, 2016.

\* cited by examiner

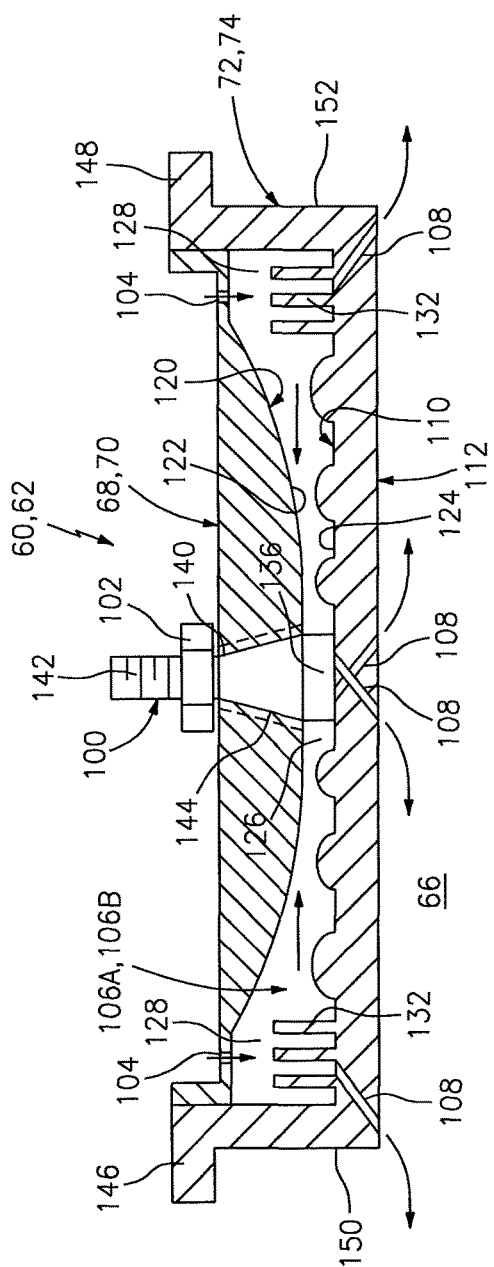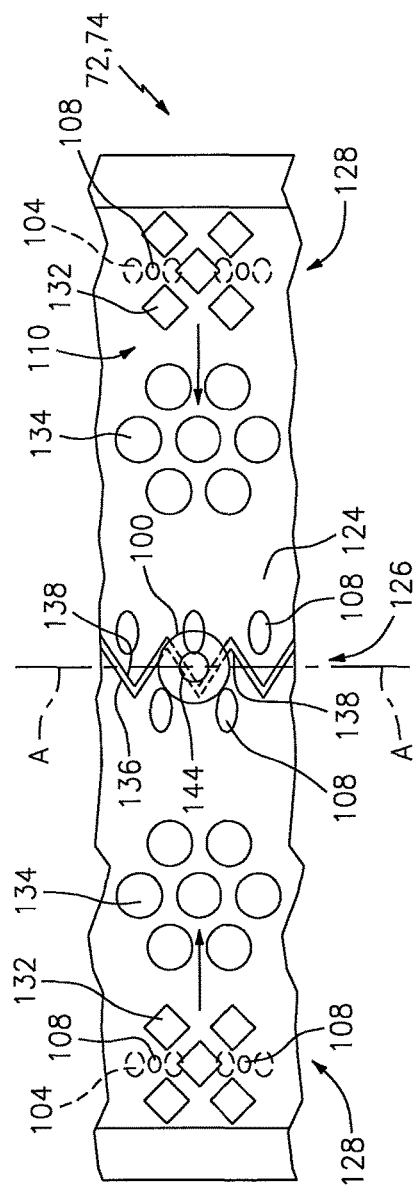

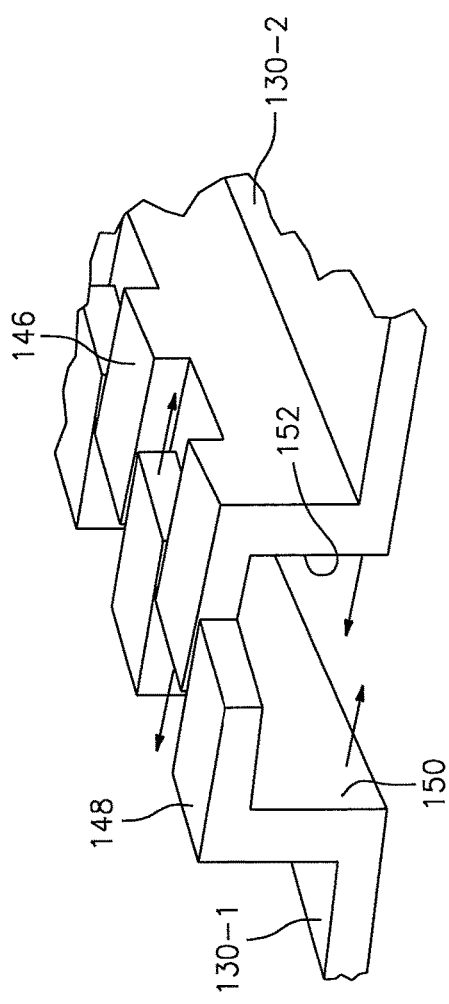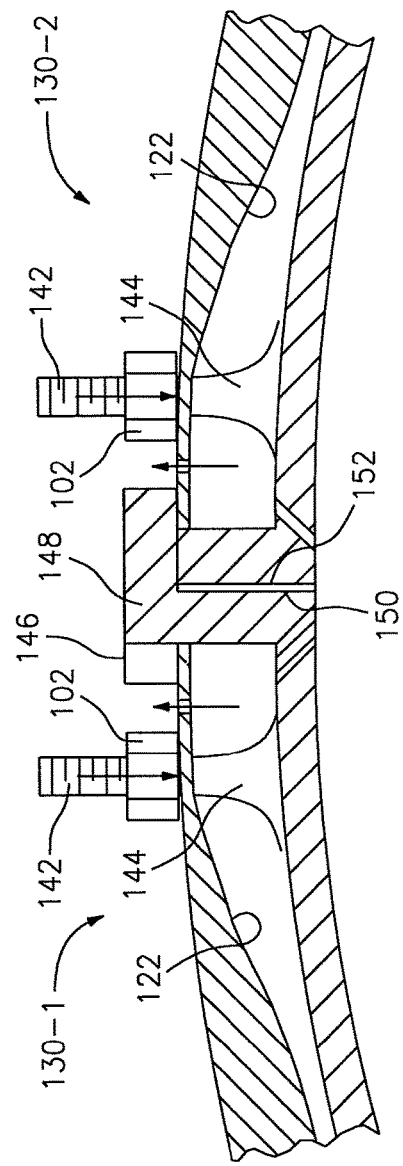

GAS TURBINE ENGINE COMBUSTOR LINER ASSEMBLY WITH CONVERGENT HYPERBOLIC PROFILE

This application claims priority to PCT Patent Application No. PCT/US14/14819 filed Feb. 5, 2014, which claims priority to U.S. Patent Appln. No. 61/762,367 filed Feb. 8, 2013.

BACKGROUND

The present disclosure relates to a gas turbine engine and, more particularly, to a combustor section therefor.

Gas turbine engines, such as those that power modern commercial and military aircraft, generally include a compressor to pressurize an airflow, a combustor for burning a hydrocarbon fuel in the presence of the pressurized air, and a turbine to extract energy from the resultant combustion gases.

As engine requirements increase for improved thrust specific fuel consumption (TSFC), compressor discharge pressure and temperature along with combustor exit temperatures (CET) may also increase. As a result, current combustor configurations emissions, such as NOx, CO, unburned hydrocarbons (UHC), and smoke, may increase relative to exceedingly stringent emissions standards.

SUMMARY

A heat shield for a combustor of a gas turbine engine according to one disclosed non-limiting embodiment of the present disclosure includes a first edge with a first set of cantilevered members and a second edge with a second set of cantilevered members interleaved with the first set of cantilevered members.

A further embodiment of any of the foregoing embodiments of the present disclosure includes interleaved cantilevered members between the first heat shield and the second heat shield.

A further embodiment of any of the foregoing embodiments of the present disclosure includes an exit splitter that extends from the heat shield.

A further embodiment of any of the foregoing embodiments of the present disclosure includes, wherein the exit splitter is zigzag in shape.

A further embodiment of any of the foregoing embodiments of the present disclosure includes, further comprising a film hole located in a valley on each side of the exit splitter.

A further embodiment of any of the foregoing embodiments of the present disclosure includes, further comprising a plurality of studs which extend from the heat shield, the stud includes a frustro-conical section.

A further embodiment of any of the foregoing embodiments of the present disclosure includes, wherein the heat shield includes a multiple of pin fins.

A further embodiment of any of the foregoing embodiments of the present disclosure includes, wherein the multiple of pin fins are diamond-shaped.

A further embodiment of any of the foregoing embodiments of the present disclosure includes, wherein the heat shield includes a multiple of hemi-spherical nubbins.

A further embodiment of any of the foregoing embodiments of the present disclosure includes, wherein the multiple of hemi-spherical nubbins decrease in diameter toward an exit splitter.

A further embodiment of any of the foregoing embodiments of the present disclosure includes, wherein a center of the sphere of each of the multiple of hemi-spherical nubbins are further displaced from an inner surface of the heat shield toward an exit splitter.

A liner assembly for a combustor of a gas turbine engine according to another disclosed non-limiting embodiment of the present disclosure includes a first heat shield and a second heat shield interleaved with the first heat shield.

A further embodiment of any of the foregoing embodiments of the present disclosure includes, wherein the second heat shield is interleaved with the first heat shield at interleaved cantilevered members between the first heat shield and the second heat shield.

A further embodiment of any of the foregoing embodiments of the present disclosure includes, further comprising a plurality of studs which extend from the first heat shield and are received through the first support shell, the plurality of studs include a frustro-conical section.

A further embodiment of any of the foregoing embodiments of the present disclosure includes, further comprising a nut which threads to the stud to force the first support shell onto the first heat shield.

A further embodiment of any of the foregoing embodiments of the present disclosure includes, wherein the nut threads to the stud to drive together the interleaved cantilevered members between the first heat shield and the second heat shield.

A further embodiment of any of the foregoing embodiments of the present disclosure includes a first support shell with a non-planar profile which faces the first heat shield and a second support shell with a non-planar profile which faces the second heat shield A method of mounting a liner assembly of a combustor for a gas turbine engine according to another disclosed non-limiting embodiment of the present disclosure includes interleaving a first heat shield with a second heat shield.

A further embodiment of any of the foregoing embodiments of the present disclosure includes interleaving a first set of cantilevered members that extend from the first heat shield with a second set of cantilevered members that extend from the second heat shield.

A further embodiment of any of the foregoing embodiments of the present disclosure includes threading a nut to a stud that extends from the first heat shield to drive a support shell onto the first heat shield.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 6 is an expanded lateral sectional view of a liner assembly according to one non-limiting embodiment;

FIG. 8 is an expanded plan view of a heat shield of a liner assembly according to one non-limiting embodiment;

FIG. 10 is an expanded lateral sectional view of two adjacent liner assemblies;

FIG. 11 is an expanded perspective view of an overlapping interface between two adjacent liner assemblies;

DETAILED DESCRIPTION

Figure 1:
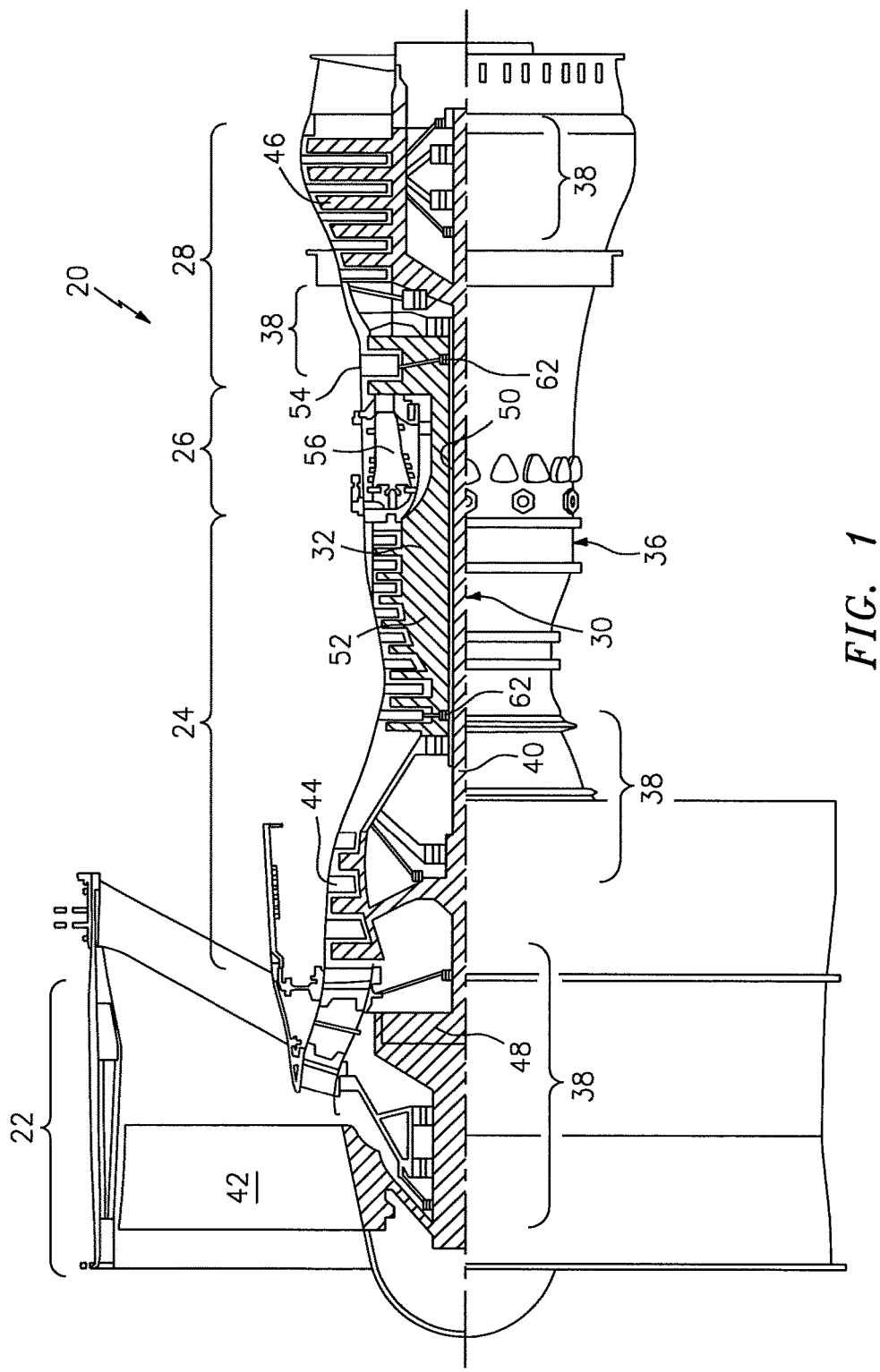
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

Figure 2:
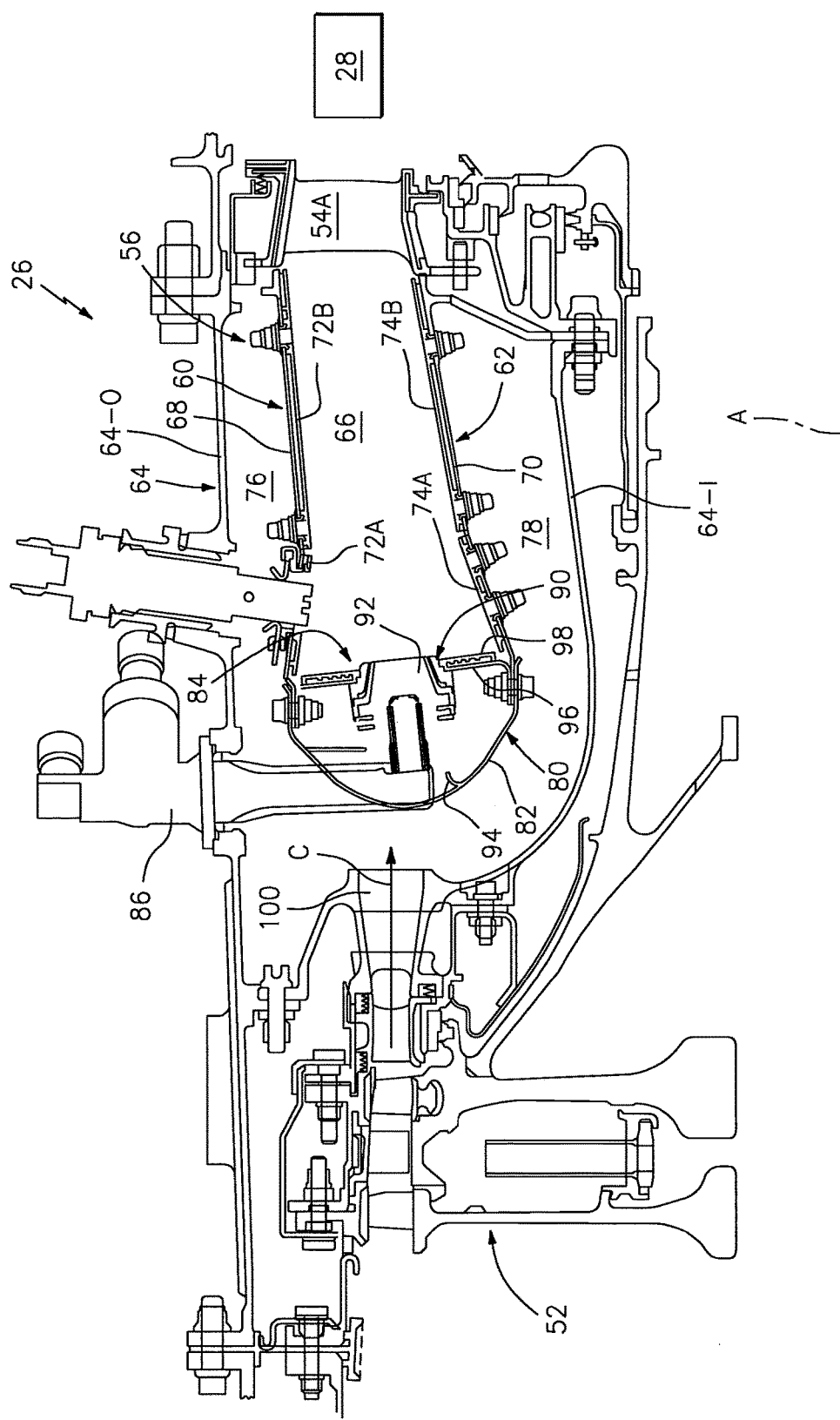
FIG. 2 is an expanded longitudinal schematic sectional view of a combustor section according to one non-limiting embodiment that may be used with the gas turbine engine shown in FIG. 1.

With reference to FIG. 2, the combustor 56 generally includes an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor liner assemblies 60, 62 contain the combustion products for direction toward the turbine section 28. Each combustor liner assembly 60, 62 generally includes a respective support shell 68, 70 which supports one or more heat shields 72, 74 mounted to a hot side of the respective support shell 68, 70. Each of the heat shields 72, 74 may be generally rectilinear and manufactured of, for example, a nickel based super alloy, ceramic or other temperature resistant material and are arranged to form a liner array. In one disclosed non-limiting embodiment, the liner array includes a multiple of forward heat shields 72A and a multiple of aft heat shields 72B that are circumferentially staggered to line the hot side of the outer shell 68 (also shown in FIG. 3). A multiple of forward heat shields 74A and a multiple of aft heat shields 74B are circumferentially staggered to line the hot side of the inner shell 70 (also shown in FIG. 3).

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle pre-swirlers 90 (one shown). Each of the fuel nozzle pre-swirlers 90 is circumferentially aligned with one of the hood ports 94 to project through the bulkhead assembly 84. Each bulkhead assembly 84 includes a bulkhead support shell 96 secured to the combustor liner assemblies 60, 62, and a multiple of circumferentially distributed bulkhead heat shields 98 secured to the bulkhead support shell 96 around the central opening 92.

The annular hood 82 extends radially between, and is secured to, the forwardmost ends of the combustor liner assemblies 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of chemical energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
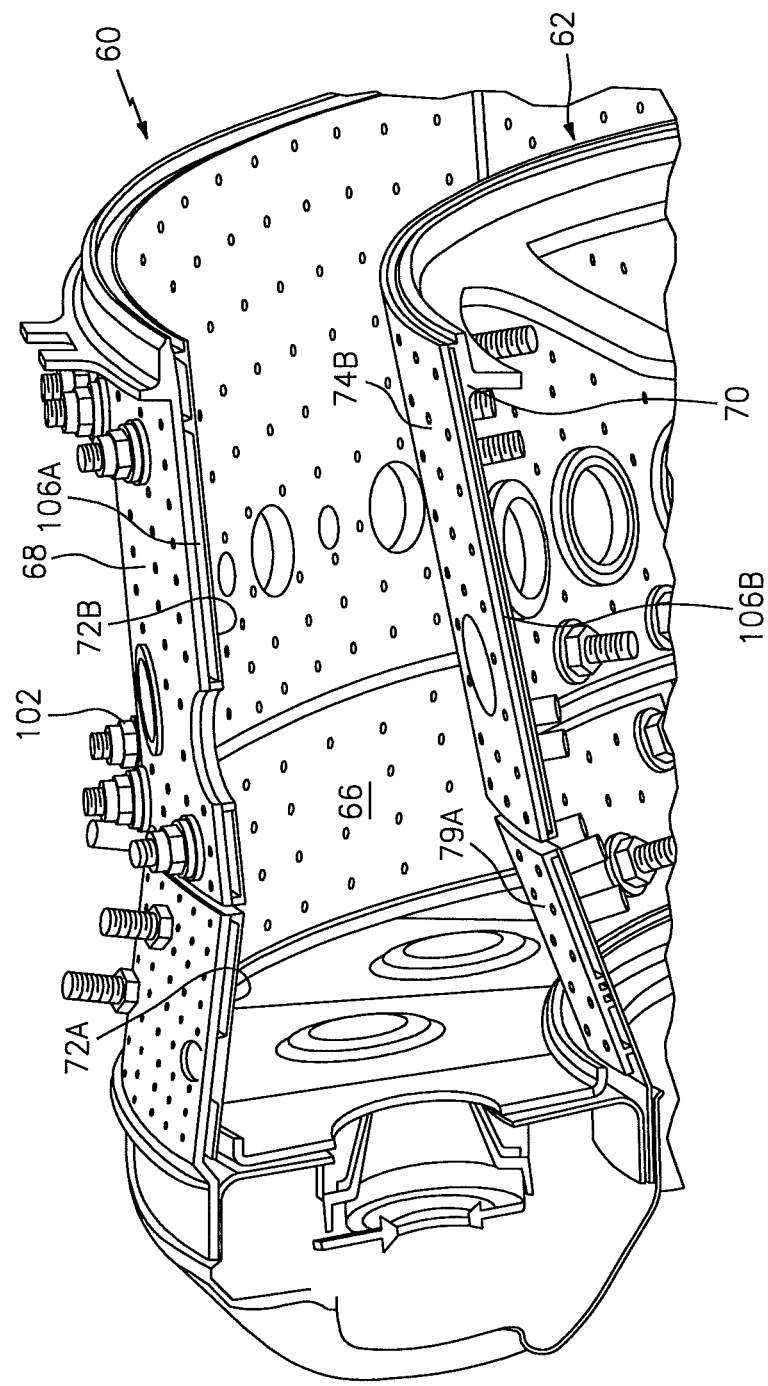
FIG. 3 is an expanded partial perspective longitudinal schematic view of a combustor section according to one non-limiting embodiment that may be used with the gas turbine engine shown in FIG. 1.
Figure 4:
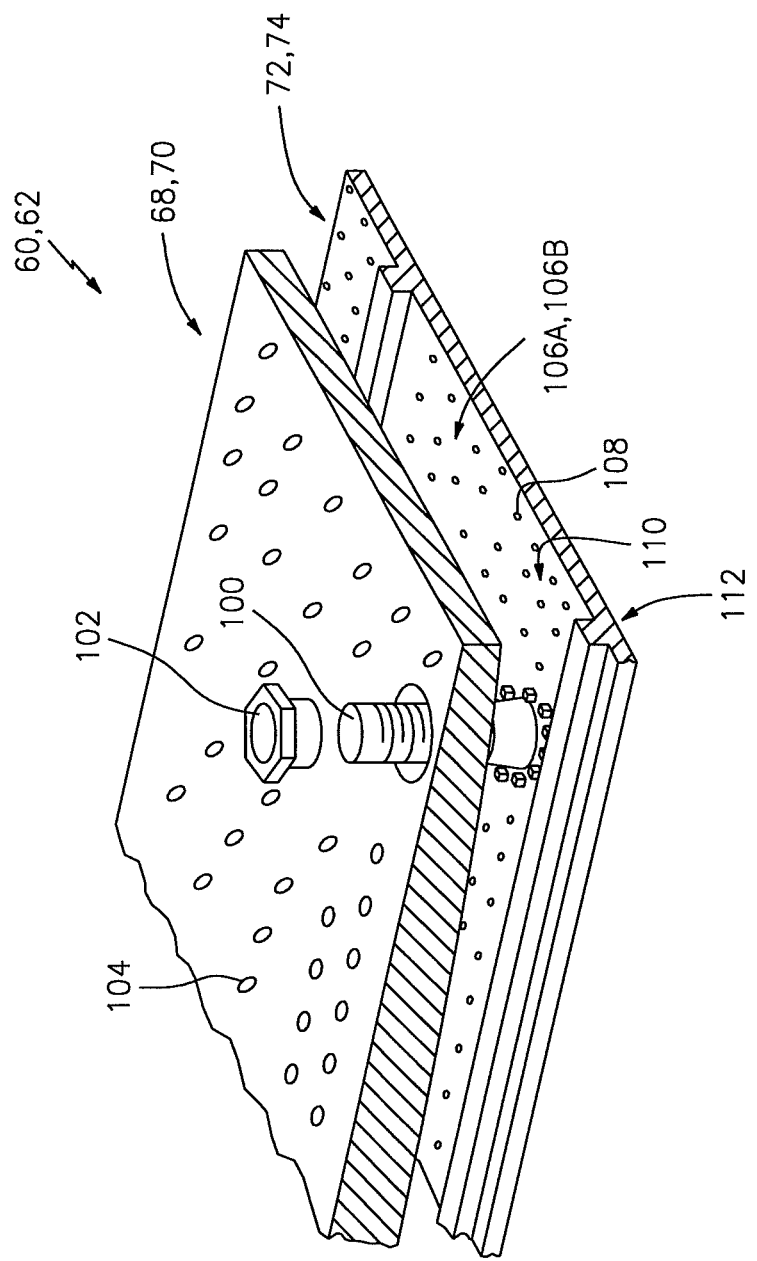
FIG. 4 is an exploded view of a liner assembly of the combustor.

With reference to FIG. 4, a multiple of studs 100 extend from the heat shields 72, 74 to mount the heat shields 72, 74 to the respective support shells 68, 70 with fasteners 102 such as nuts (also shown in FIG. 3). That is, the studs 100 project rigidly from the heat shields 72, 74 and through the respective support shells 68, 70 to receive the fasteners 102 at a threaded distal end section thereof.

A multiple of cooling impingement holes 104 penetrate through the support shells 68, 70 to allow air from the respective annular plenums 76, 78 to enter cavities 106A, 106B (also shown in FIG. 3) formed in the combustor liner assemblies 60, 62 between the respective support shells 68, 70 and heat shields 72, 74. The cooling impingement holes 104 are generally normal to the surface of the heat shields 72, 74. The air in the cavities 106A, 106B provides backside impingement cooling of the heat shields 72, 74 that is generally defined herein as heat removal via internal convection.

A multiple of cooling film holes 108 penetrate through each of the heat shields 72, 74. The geometry of the film holes, e.g., diameter, shape, density, surface angle, incidence angle, etc., as well as the location of the holes with respect to the high temperature main flow also contributes to effusion film cooling. The combination of impingement holes 104 and film holes 108 may be referred to as an Impingement Film Floatwall liner assembly.

The cooling film holes 108 allow the air to pass from the cavities 106A, 106B defined in part by a cold side 110 of the heat shields 72, 74 to a hot side 112 of the heat shields 72, 74 and thereby facilitate the formation of a film of cooling air along the hot side 112. The cooling film holes 108 are generally more numerous than the impingement holes 104 to promote the development of a film cooling along the hot side 112 to sheath the heat shields 72, 74. Film cooling as defined herein is the introduction of a relatively cooler airflow at one or more discrete locations along a surface exposed to a high temperature environment to protect that surface in the immediate region of the airflow injection as well as downstream thereof.

Figure 5:
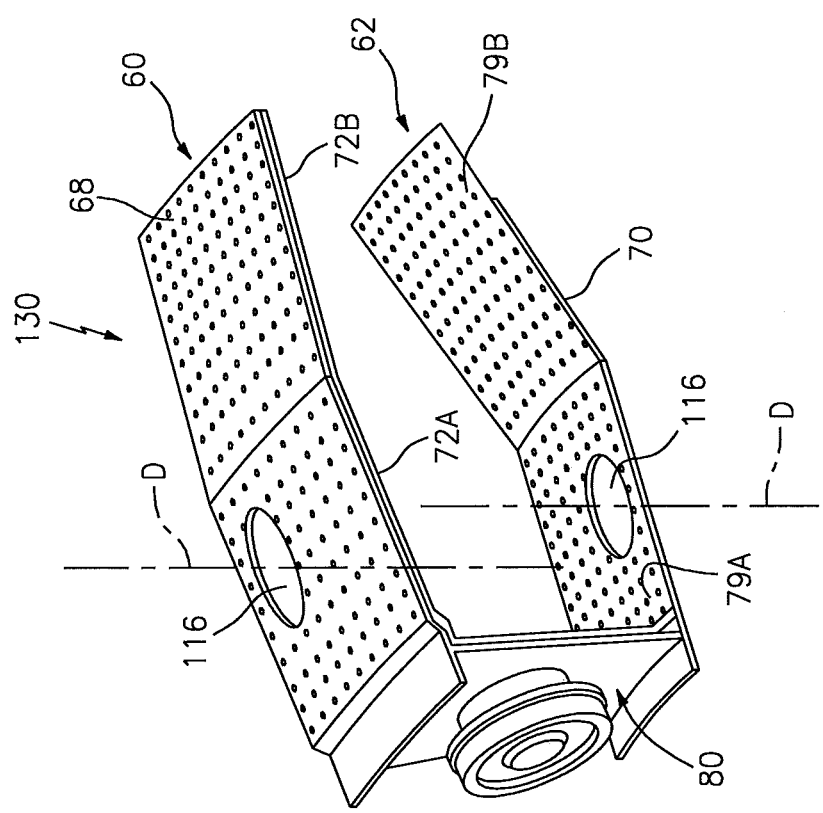
FIG. 5 is an expanded circumferentially partial perspective view of the combustor section associates with one pre-swirler.

A multiple of dilution holes 116 penetrate through both the respective support shells 68, 70 and heat shields 72, 74 along an axis that could be common or uncommon as indicated in FIG. 5. For example only, in a Rich-Quench-Lean (R-Q-L) type combustor, the dilution holes 116 are located downstream of the forward assembly 80 to quench the hot gases by supplying cooling air into the combustor. The hot combustion gases slow towards the dilution holes 116 and may form a stagnation point at the leading edge which becomes a heat source. At the trailing edge of the dilution hole, due to interaction with dilution jet, hot gases form a standing vortex pair that may also become a heat source.

With reference to FIG. 6, a lateral cross-section of the support shells 68, 70 and heat shields 72, 74 with their respective cavities 106A, 106B are illustrated with respect to the combustion chamber 66. Although only one of the support shells 68, 70 and heat shields 72, 74 is illustrated and described in detail hereafter, it should be understood that each of the support shells 68, 70 and heat shields 72, 74 are generally the same and need not be described in detail herein.

An inner surface 120 of each support shell 68, 70 defines a non-planar profile 122 such as a hyperbolic or catenary profile that faces an inner surface 124 of the heat shields 72, 74 within the respective cavities 106A, 106B. The inner surface 120 of each support shell 68, 70 defines a relatively thin cavity zone 126 along a central portion of each combustor section 128 with respect to the inner surface 124 of the heat shields 72, 74. That is, the relatively thin cavity zone 126 is defined generally parallel to the engine axis A and is flanked by relatively thicker cavity zones 128 of each combustor section 130 (FIG. 5).

Figure 7:
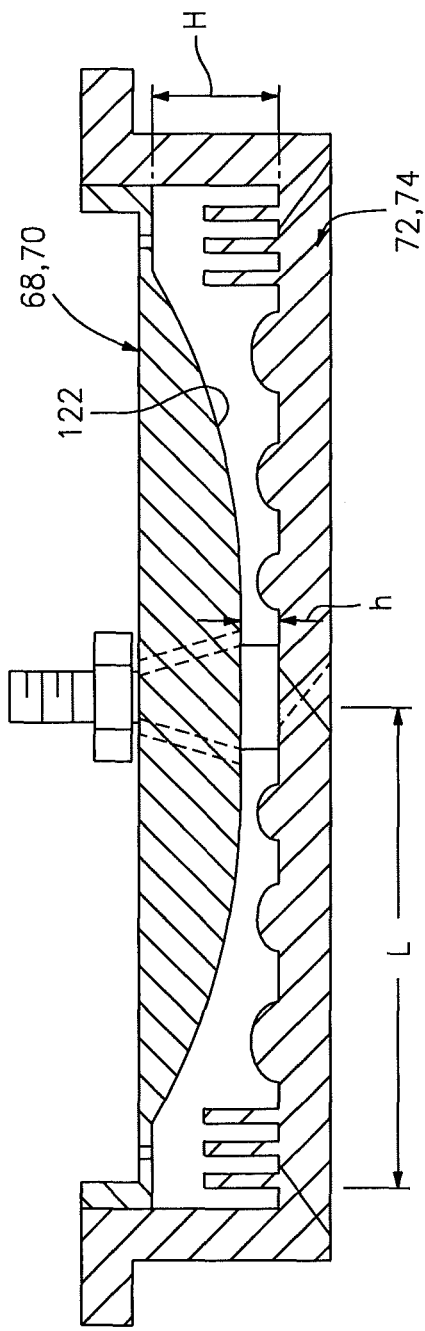
FIG. 7 is an expanded lateral sectional view of the liner assembly of FIG. 6 with a relationship for a non-planar profile that faces an inner surface of a heat shield of the liner assembly.

With Reference to FIG. 7, the convergent support shell 68, 70 profile may be the catenary profile is defined by a hyperbolic cosine function, cos h, which provides an approximate 4.5 inlet-to-exit area ratio. The inlet-to-exit area ratio forces a flow acceleration at an end of a circumferential convergent flow section. A corresponding increase in Reynolds number facilitates higher internal heat transfer coefficients for cooling.

With reference to FIG. 8, the relatively thicker cavity zones 128 receive airflow from the impingement holes 104. The airflow within the cavities 106A, 106B is from the relatively thicker cavity zones 128 toward the relatively thin cavity zone 126 to define the circumferential convergent flow section. That is, the airflow is generally in the circumferential direction rather than axial direction.

In one disclosed non-limiting embodiment, the impingement holes 104 direct airflow onto a multiple of pin fins 132. The pin fins 132 in one example, may be diamond shaped pins that are approximately ½-¾ the height between the inner surfaces 120, 124 in the relatively thicker cavity zones 128. It should be appreciated that other heights may be provided.

Figure 9:
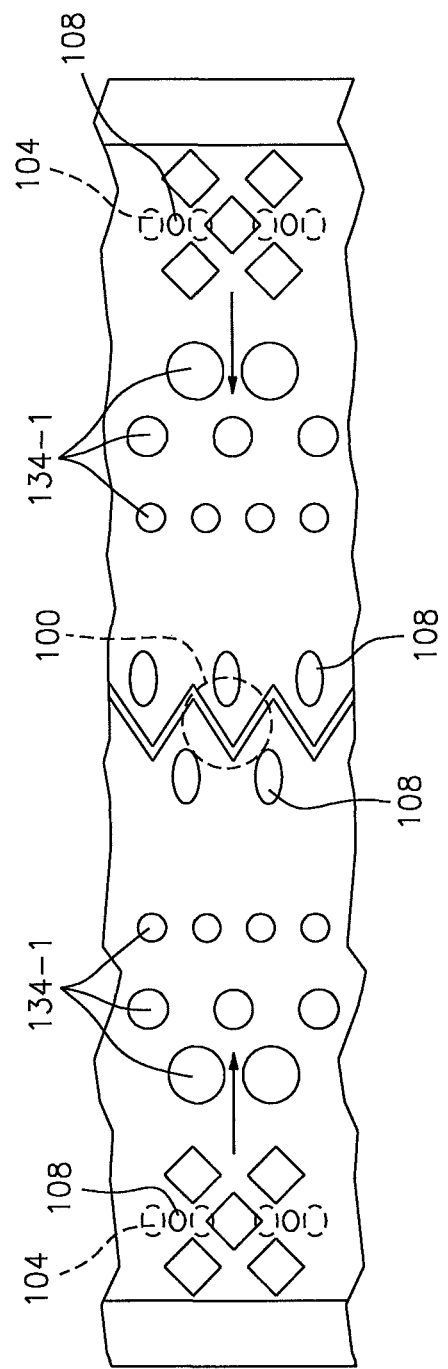
FIG. 9 is an expanded plan view of a heat shield of a liner assembly according to another non-limiting embodiment.

Inboard of the multiple of pin fins 132, a multiple of hemispherical nubbins 134 are located toward an exit splitter 136. In one disclosed non-limiting embodiment, the hemispherical nubbins 134 are of the same diameter but are progressively deeper into the inner surface 124. That is, centers of the respective spheres which in one disclosed non-limiting embodiment define the hemispherical nubbins 134 are progressively deeper into the combustion chamber 66. In another disclosed non-limiting embodiment, the hemispherical nubbins 134-1 are progressively smaller diameters toward the exit splitter 136 (FIG. 9). The hemispherical nubbins 134, 134-1 allow for less pressure resistance (less friction) that facilitates convergent flow channel acceleration capabilities. The hemispherical nubbins 134, 134-1 reduce the frictional drag resistance to the cooling flow yet augment cooling of the inner surface 124. It should be appreciated that the hemispherical nubbins 134, 134-1 may be arranged in various patterns.

The exit splitter 136 is zigzag in shape along the axis A such that a film hole 108 may be located in a valley 138 on each side of the exit splitter 136. As defined herein "zigzag" includes, but is not limited to, any serpentine, saw tooth or non-straight wall. The exit splitter 136 also forms a base for a frustro-conical stud 100 (only one shown). The stud 100 is received within a corresponding aperture 140 in the heat shields 72, 74, such that as the nut 102 is tightened down on a threaded interface 142, the aperture 140 seals and tightens onto the frustro-conical stud portion 144 (FIG. 6).

With reference to FIG. 10 the threaded interface 144 also forces sets of interleaved cantilevered members 146, 148 along each edge 150, 152 of the heat shields 72, 74 to be forced together to facilitate a seal between each adjacent combustor section 130-1, 130-2 (FIG. 11). It should be appreciated that the frustro-conical studs 100 may alternatively or additionally located in other locations such as along the edges 150, 152. The interleaved cantilevered members 146, 148 react the force applied to the frustro-conical stud 100 to minimize leakage. It should be appreciated that the interleaved cantilevered members 146, 148 may be of an L-shape, J-shape or other hook-like shape.

Figure 12:
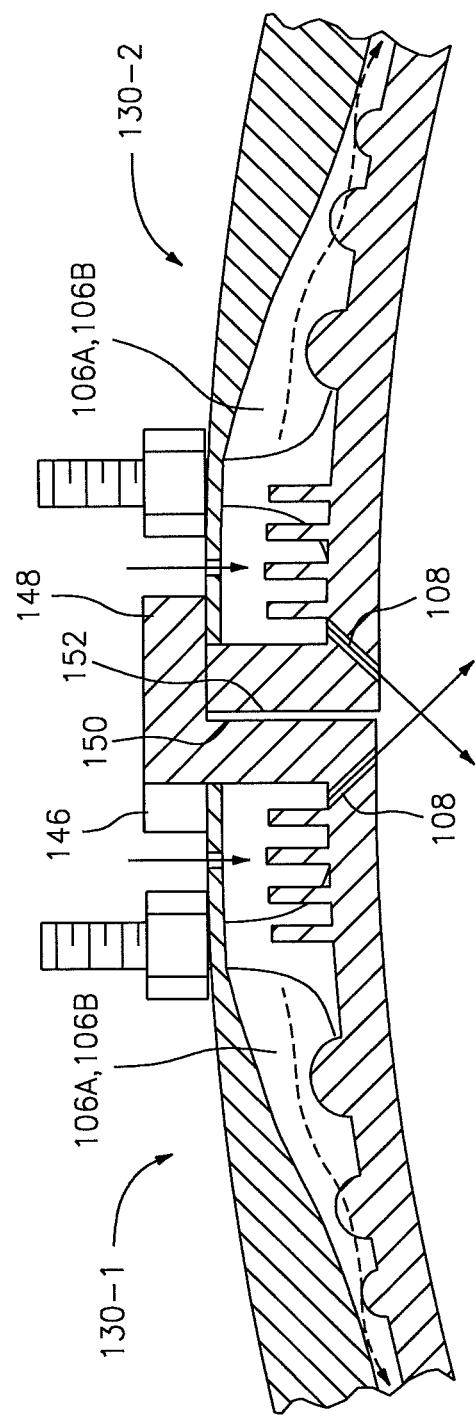
FIG. 12 is an expanded lateral sectional view of two adjacent liner assemblies.

With reference to FIG. 12, the film holes 108 along edge 150 of one combustor section 130-1 are directed toward edge 152 of the adjacent combustor section 130-2 and vice-versa. The cross-flow from the film holes 108 along edges 150, 152 protect the edges 150, 152 and further facilitate a seal between the interleaved cantilevered members 146, 148.

Figure 13:
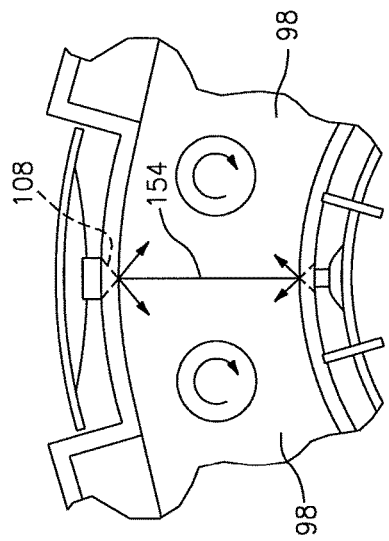
FIG. 13 is a forward view of two adjacent combustor sections facing a bulkhead heat shield illustrating cooling flow according to one non-limiting embodiment.

The frustro-conical stud 100 and interleaved cantilevered members 146, 148 facilitate a relatively higher pressure within the cavities 106A, 106B. In one example, an equal number of impingement holes 104 and film holes 108 are located in each combustor section 130 to provide a approximately 50:50 pressure split as compared to a more conventional 80:20 pressure split with approximately half the number of impingement holes 104 compared to the film holes 108. The 50:50 pressure split permits a relatively higher pressure within the cavities 106A, 106B thereby permitting a relatively smaller number of holes and thereby a more efficient usage of air by spacing impingement holes 104 and film holes 108 further apart. Reduced reaction flame temperatures are also avoid local stoichiometric conditions and thereby reduce NOx formation With reference to FIG. 13, the film holes 108 adjacent to the exit splitter 136 may be directed across an interface 154 between circumferentially distributed bulkhead heat shields 98. That is, the film holes 108 along one side of the exit splitter 136 are directed toward the opposite side and vice-versa. Such an arrangement may be advantageous when the fuel nozzle pre-swirlers 90 are axially displaced from the film holes 108.

Figure 14:
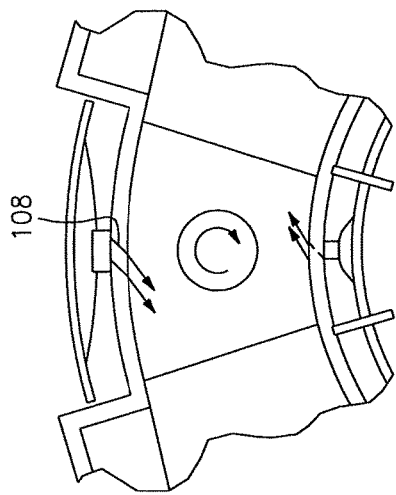
FIG. 14 is a forward view of a combustor section facing a bulkhead heat shield illustrating cooling flow according to another non-limiting embodiment.

With reference to FIG. 14, in another disclosed non-limiting embodiment, the film holes 108 on both sides of the zigzag exit splitter 136 through the heat shields 72, 74 are directed in a direction in coordination with the rotational direction of the fuel nozzle pre-swirlers 90. Such an arrangement may be advantageous when the fuel nozzle pre-swirlers 90 are positioned relatively close to the film holes 108. It should be appreciated that the rotational direction may be clockwise or counter-clockwise.

Figure 15:
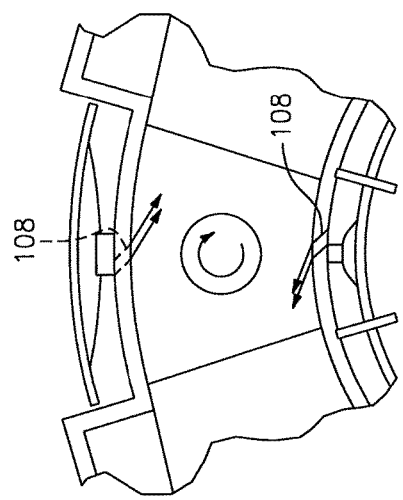
FIG. 15 is a forward view of a combustor section facing a bulkhead heat shield illustrating cooling flow according to another non-limiting embodiment.

With reference to FIG. 15, in another disclosed non-limiting embodiment, the film holes 108 on both sides of the zigzag exit splitter 136 through the heat shields 72, 74 are directed in a direction in-line the rotational direction of the fuel nozzle pre-swirlers 90.

Figure 16:
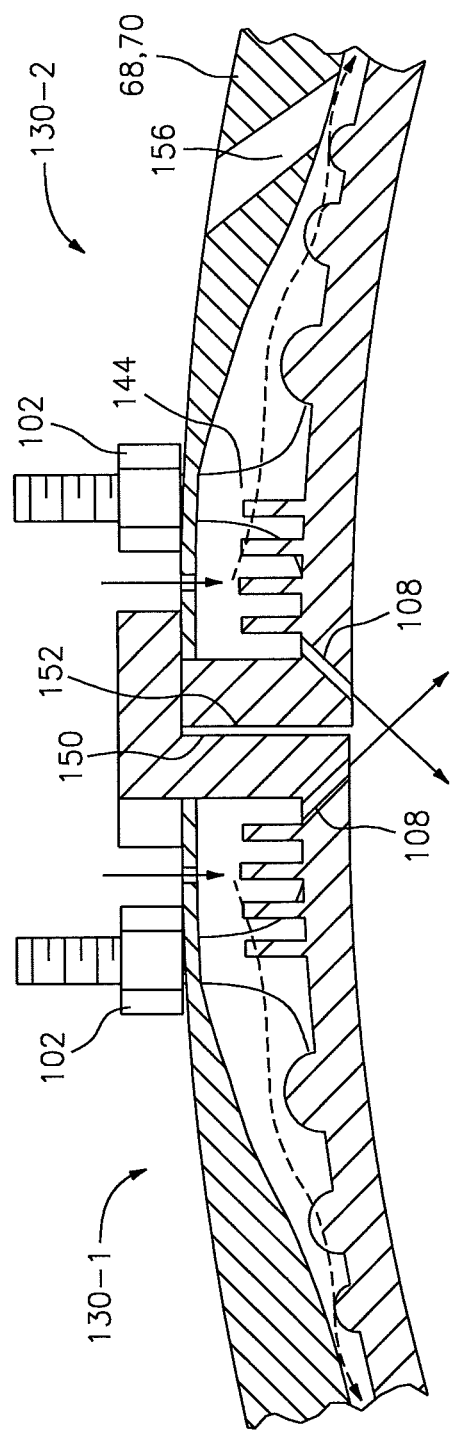
FIG. 16 is an expanded lateral sectional view of two adjacent liner assemblies.

With reference to FIG. 16, the non-planar profile 122 may include pre-drilled apertures 156 located in potential hot spots. These apertures 156 are not initially drilled completely through the support shell 68, 70. That is the pre-drilled apertures 156 are placed in the convergent section close to an area where hot-spots may occur. Should the hot-spot prediction be realized, then apertures 156 are drilled completely through the support shell 68, 70 to supply refresher air into the convergent section pre-drilled apertures 156. This will effectively address the hot-spot by maintaining the coolant heat pick-up low; while introducing more convective flow into the circuit. Furthermore, even if not drilled completely through, the pre-drilled apertures 156 provide weight reduction.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A liner assembly for a combustor of a gas turbine engine comprising:
    a first support shell;
    a first heat shield that includes a first edge with a first set of cantilevered members and a plurality of studs, each of which said studs includes a frustro-conical section, and each of which said studs extends outwardly from the first heat shield toward and through the first support shell;
    a second heat shield that includes a second edge with a second set of cantilevered members interleaved with said first set of cantilevered members.

2. The liner assembly as recited in claim 1, wherein said first set of cantilevered members and said second set of cantilevered members are hooks.

3. The liner assembly as recited in claim 1, wherein the first heat shield further comprises an exit splitter.

4. The liner assembly as recited in claim 3, wherein the first heat shield further comprises a film hole located in a valley on each side of said exit splitter.

5. The liner assembly as recited in claim 1, wherein said first heat shield includes a multiple of pin fins.

6. The liner assembly as recited in claim 5, wherein said multiple of pin fins are diamond-shaped.

7. The liner assembly as recited in claim 1, wherein said first heat shield includes a multiple of nubbins.

8. The liner assembly as recited in claim 1, wherein said first heat shield includes a multiple of nubbins, said multiple of nubbins decrease in diameter toward said exit splitter.

9. The liner assembly as recited in claim 1, wherein said first heat shield includes a multiple of hemispherical nubbins, wherein a center of each of said multiple of nubbins are further displaced from an inner surface of said first heat shield toward said exit splitter.

10. A liner assembly for a combustor of a gas turbine engine comprising:
    a first support shell;
    a first heat shield that includes a plurality of studs, each of which said studs includes a frustro-conical section, and each of which said studs extends outwardly from the first heat shield toward and through the first support shell; and
    a second heat shield;
    wherein said second heat shield is interleaved with said first heat shield at interleaved cantilevered members between said first heat shield and said second heat shield.

11. The liner assembly as recited in claim 10, further comprising a plurality of nuts, each of which nuts threads onto a respective one of said studs to force said first support shell onto said first heat shield.

12. The liner assembly as recited in claim 11, wherein each of said nuts threads to said respective stud to drive together the interleaved cantilevered members together.

13. The liner assembly as recited in claim 10, further comprising a second support shell with a non-planar profile which faces said second heat shield; and
    wherein the first support shell includes a non-planar profile which faces said first heat shield.

14. A method of mounting a liner assembly of a combustor for a gas turbine engine, comprising:
    interleaving a first set of cantilevered members that extend from a first heat shield with a second set of cantilevered members that extend from a second heat shield;
    wherein the first heat shield includes a plurality of studs, each of which said studs includes a frustro-conical section, and each of which said studs extends outwardly from the first heat shield toward and through the first support shell; and
    driving together the interleaved cantilevered members together by threading a nut onto each respective stud.

* * * * *